United States Patent
Mikhaylov et al.

(10) Patent No.: US 11,132,673 B1
(45) Date of Patent: Sep. 28, 2021

(54) USE OF SECURE CHIPS FOR STORAGE OF HASHED DATA AND PRIVATE KEYS IN HARDWARE CRYPTOWALLETS

(71) Applicant: SAFEWALLET PTE. LTD, Singapore (SG)

(72) Inventors: Dmitry M. Mikhaylov, Moscow (RU); Artem Dolgikh, Moscow (RU); Yaugeny Hrudovich, Minsk (BY); Vladimir Rutsky, Minsk (BY); Denis Bildyuk, Minsk (BY); Ruslan Aksenov, Moscow (RU); Dmitry Rubin, Moscow (RU); Igor Dusha, Moscow (RU)

(73) Assignee: Dmitry Mikhailov, Moscow (RU)

( * ) Notice: Subject to any disclaimer, the term of this patent is extended or adjusted under 35 U.S.C. 154(b) by 396 days.

(21) Appl. No.: 15/962,527

(22) Filed: Apr. 25, 2018

(51) Int. Cl.
*G06Q 20/36* (2012.01)
*G06Q 20/40* (2012.01)
*G06Q 20/32* (2012.01)
*G06Q 20/06* (2012.01)

(52) U.S. Cl.
CPC ....... *G06Q 20/3678* (2013.01); *G06Q 20/065* (2013.01); *G06Q 20/3278* (2013.01); *G06Q 20/4012* (2013.01); *G06Q 2220/00* (2013.01)

(58) Field of Classification Search
None
See application file for complete search history.

(56) References Cited

U.S. PATENT DOCUMENTS

| | | | | |
|---|---|---|---|---|
| 2008/0261561 A1* | 10/2008 | Gehrmann | ............ | H04W 12/04 455/411 |
| 2009/0020603 A1* | 1/2009 | Foesser | ................. | G07F 7/1008 235/380 |
| 2010/0199077 A1* | 8/2010 | Case | ..................... | H04L 9/3271 713/1 |
| 2013/0138964 A1* | 5/2013 | Joyce, III | ......... | G06Q 20/40145 713/176 |

(Continued)

*Primary Examiner* — Jamie R Kucab
*Assistant Examiner* — Nicholas K Phan
(74) *Attorney, Agent, or Firm* — Bardmesser Law Group (57) ABSTRACT

A cryptowallet includes a microcontroller configured to communicate with a cryptowallet application running on a host; a touch display connected to the microcontroller and used to input a PIN code and a mnemonic seed for the cryptowallet for each cryptocurrency, and to output a destination address for a transaction and the mnemonic seed; a secure cryptoprocessor having storage and cryptographic logic. The storage stores a file system representing multiple cryptocurrencies. The file system is a tree that stores a private key for each cryptocurrency. The cryptowallet application is configured to communicate with a cryptocurrency network communication component, for carrying out transactions using the cryptocurrencies, that are authorized by using the private key upon providing the PIN code and the destination address of the transaction to the cryptoprocessor. The cryptographic logic implements cryptographic functions required by the cryptocurrencies. Connection between the microcontroller and the secure cryptoprocessor can be performed via the ISO7816 or NFC interfaces. The cryptowallet is configured to connect to the host using a USB connection.

14 Claims, 10 Drawing Sheets

(56) References Cited

U.S. PATENT DOCUMENTS

| | | | | |
|---|---|---|---|---|
| 2014/0013110 A1* | 1/2014 | Thoniel | .................. | H04L 9/321 |
| | | | | 713/156 |
| 2014/0229729 A1* | 8/2014 | Roth | .................. | G06F 21/6218 |
| | | | | 713/153 |
| 2014/0263627 A1* | 9/2014 | Wyatt | .................. | G06Q 20/352 |
| | | | | 235/380 |
| 2014/0351494 A1* | 11/2014 | Barthe | ................ | G06F 12/0246 |
| | | | | 711/103 |
| 2018/0322138 A1* | 11/2018 | Chang | ................ | G06F 16/1727 |
| 2019/0095655 A1* | 3/2019 | Krawczewicz | ....... | H04W 12/06 |
| 2019/0121988 A1* | 4/2019 | van de Ruit | ........... | G06Q 20/36 |
| 2019/0289454 A1* | 9/2019 | Inoue | .................. | H04L 9/0825 |

\* cited by examiner

FIG. 10

USE OF SECURE CHIPS FOR STORAGE OF HASHED DATA AND PRIVATE KEYS IN HARDWARE CRYPTOWALLETS

FIELD OF THE INVENTION

The present invention relates to use of secure cryptoprocessors controlled by the JAVACard OS for creation of cryptocurrency management computer appliances (cryptowallets). The invention also relates to secure data storage, particularly to securing personal data in hardware-based cryptocurrency wallets.

DESCRIPTION OF THE RELATED ART

Currently, various cryptocurrencies and transactions related to them are on the rise around the world. Cryptocurrencies are widely used among blockchain participants in order to carry out various transactions.

As the number of blockchain transactions increases, their monetary amounts also increase, and so does the risk of intruders gaining unauthorized access to user data in order to steal their cryptocurrency.

Personal data—a personal key for signing transactions—are stored on the user's side, either on the user's computer, on a remote server or on a personal encrypted storage (cryptowallet).

Both the user's computer and remote server have certain vulnerabilities and are therefore prone to attacks by intruders aimed at stealing personal data of users. Personal encrypted storages (cryptowallets) thus need a demilitarized zone to store the user's personal data and protect them from unauthorized access.

SUMMARY OF THE INVENTION

The functional purpose of a cryptowallet is to provide for protected generation, recovery and usage of a cryptographic key space to manage cryptowallet balances and access to the account of the wallet holder. This requires not only secure storage of private keys for cryptocurrency addresses, but also control after the integrity of hardware and software, as well as protection from unauthorized access to or forging of cryptowallet data objects.

The cryptowallet application and additional online services should preferably be complementary and auxiliary, and they should enhance the ergonomics of a cryptowallet and provide supplemental control after the integrity of structural and functional hardware nodes is ensured.

In one embodiment, there is provided a cryptowallet, including a microcontroller configured to communicate with a cryptowallet application running on a host; a touch display connected to the microcontroller and used to input a PIN code and a mnemonic seed for the cryptowallet for each cryptocurrency, and to output a destination address for a transaction and the mnemonic seed; a secure cryptoprocessor having storage and cryptographic logic. The storage stores a file system representing multiple cryptocurrencies. The file system is a tree that stores a private key for each cryptocurrency. The cryptowallet application is configured to communicate with a cryptocurrency network communication component, for carrying out transactions using the cryptocurrencies, that are authorized by using the private key upon providing the PIN code and the destination address of the transaction to the secure cryptoprocessor. The cryptographic logic implements cryptographic functions required by the cryptocurrencies. The cryptowallet is configured to connect to the host using a USB connection.

Optional transit logic for interconnect to blockchain network could be implemented in application of host device and connected to secure cryptoprocessor (controlled by the JAVACard OS) by NFC protocol Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

System Structure

Figure 1:
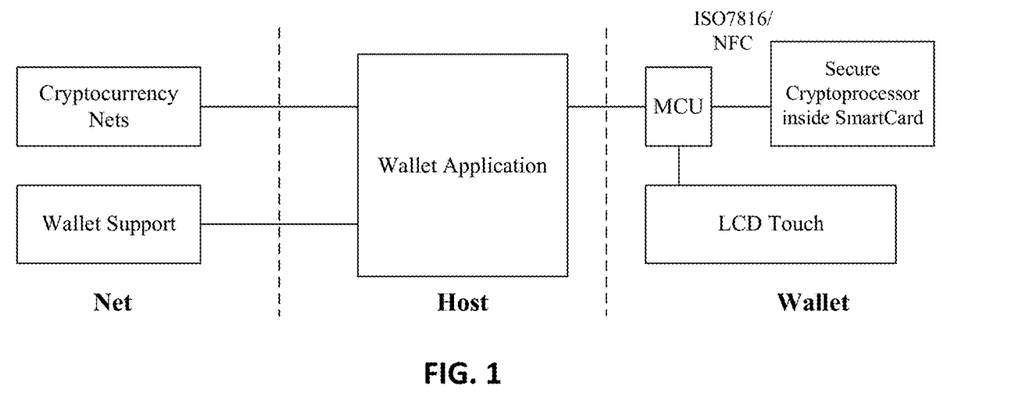
FIG. 1 shows an example of a structural schematic for a system based on a secure cryptoprocessor.

If a secure cryptoprocessor inside SmartCard (cryptochip or secure cryptoprocessor) is used, the following structural schematic is proposed, see FIG. 1, illustrating key modules of the structural schematic. The structure includes three components: a hardware-based cryptowallet (Wallet), host software (Host) and a network-based component (Net).

A cryptochip is the primary security component in the cryptowallet architecture. If required, it may be made in a portable embodiment, which may be further connected to the system's hardware or optionally can be used directly to host device application by NFC connection. A secure cryptoprocessor is, essentially, a secure storage with an implementation of all the relevant functions concerning information security and cryptographic functions and transformations (non-limiting examples of these are SHA-1, SHA-2, SHA-256 hash functions, operations with digital signatures, AES, DES, Blowfish/Twofish and similar algorithms, etc.). The secure cryptoprocessor ensures that data stored in its secure memory can only be accessed by providing a correct cryptographic key, and cannot be accessed otherwise.

A microcontroller (MCU) is the control element of a cryptowallet, connecting the wallet to the display (LCD Touch), and the host wallet application through a USB or a microUSB connection or similar. The wallet application transmits a result of a signed transaction to the server, after receiving the transaction from the cryptowallet. It also provides an interface to the user for working with the cryptowallet (such as displaying balances for the various cryptocurrencies, displaying the current state of the cryptowallet, permits exchanging one currency for another, shows a list/history of transactions, permits sending money to some address, and generally permits various operations with the cryptowallet).

A cryptochip and MCU can be integrated via interfaces ISO7816 or NFC interfaces (or other typical connections for SmartCards).

A display (LCD Touch) is used to input and output the cryptowallet state, particularly, to control the seed #MNEMONICSEED0, applets #APPLET0, transactions #TRANSACTION0, and cryptowallet parameters.

The cryptowallet application is used to control the cryptowallet and is executed on the host hardware. Its functions may include: installation of applets #APPLET0, display of account balances, initiation of transactions, management of cryptowallet parameters.

The cryptocurrency net communication component allows to carry out transactions and get information on cryptowallet states. Typically, this is a webserver or a webservice to which the wallet application connects in order to perform a blockchain transaction.

Cryptowallet

Figure 2:
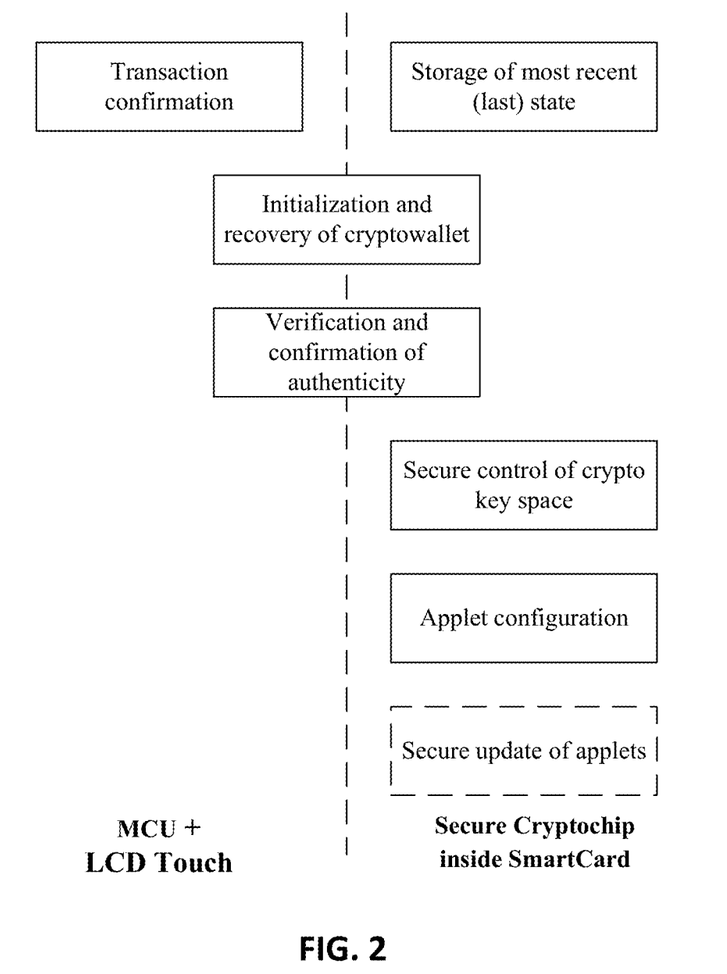
FIG. 2 shows a functional schematic for a system based on a secure cryptoprocessor.

According to the structural schematic (see FIG. 1), the cryptowallet includes three main elements: a MCU, an LCD Touch, and a secure cryptoprocessor. From a functional point of view, it may be divided into two main elements:

- a secure cryptoprocessor is the main unit that runs the semantic core of the cryptowallet and performs basic information security functions;
- MCU+LCD Touch is a joint unit that contains no personal data or data objects, since that can compromise the entire information security of the system.
- The connection between the MCU and the secure cryptoprocessor can be performed via the ISO7816 or NFC interfaces Thus, the functional schematic of a cryptowallet may be represented by two sets of functional units (see FIG. 2). The advantage of such division is in strictly different purposes of both chips, where the MCU is used to broadcast information via cryptographically strong protocols and to control the LCD Touch, while the secure cryptoprocessor is used to store personal information in a secure area.

Figure 3:
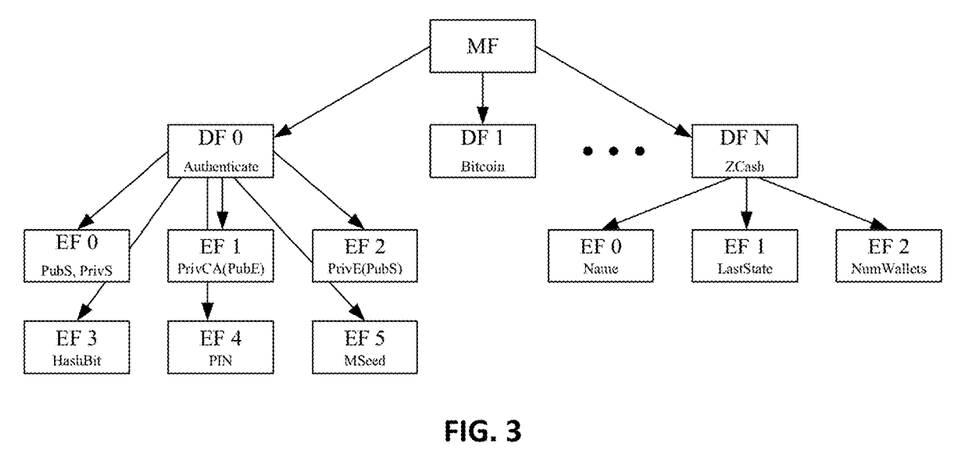
FIG. 3 shows the structure of the secure cryptoprocessor file system.

[#APPLET0] From a functional point of view, a secure cryptoprocessor may be viewed as a set of applets managed by the JavaCard OS. The logical structure of this OS allows each applet to be assigned a specific file structure. The general file system structure may look as shown in FIG. 3.

The novelty of such approach consists in using a file structure with tree-like branching to store the necessary information about Private Key, MSeed, and algorithms to work in distributed database networks. This embodiment allows to store and then process transactions with any cryptocurrency—all on a single chip. The number of different currencies depends on the memory amount of the chip only.

Verification and Authentication

In addition to structural and visual methods for hardware validation, a cryptowallet has software-based verification and authentication methods, specifically, a three-level PKI system and the secure cryptoprocessor dynamic authentication procedure. This secure cryptoprocessor implementation, along with a secure memory area, provides maximum protection for personal information. The use of the proposed algorithm-building principles in creation of cryptowallet computer appliances has not been done before.

Figure 4:
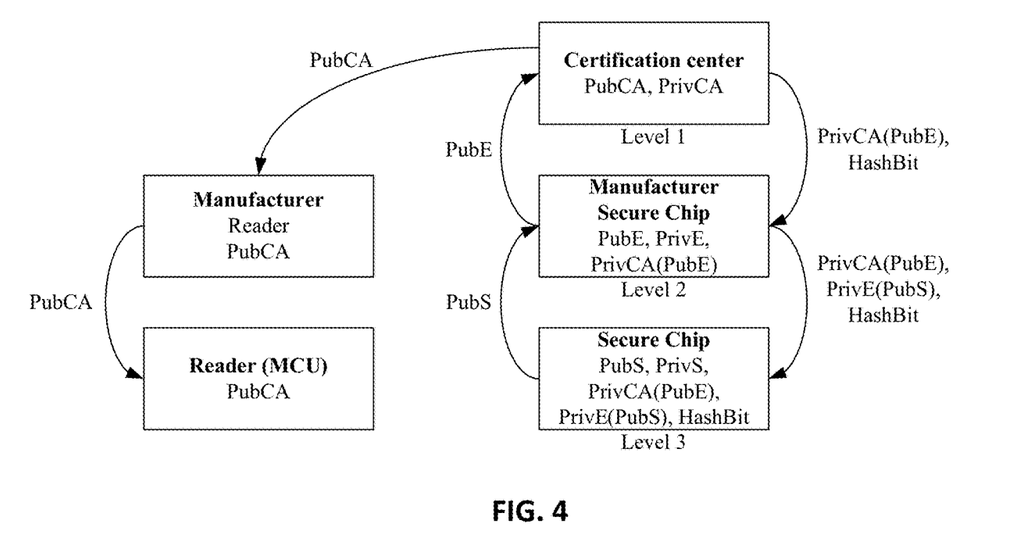
FIG. 4 shows an example of a location of the PKI key space.

The first level contains a system certification center, whose primary function is to certify Smart card (with a cryptochip) manufacturers. The second level contains Smart card manufacturers (who perform the first initialization), and the third level contains the Smart cards themselves. Elements of all levels have (or generate) their own public-private key pairs (Pub and Priv), except Readers and their manufacturers (see FIG. 4).

Each lower level generates its key pairs independently, certifying its public key with the higher-level private key. Public key certificates conform to X.509, and are marked as the PrivX(PubY) function in FIG. 4, where X is a higher level, and Y is a lower level.

The PKI infrastructure is based on the ElGamal encryption system using elliptic curves defined over a prime field. In accordance with RFC5639, each level has its own field order and curve: 1—brainpoolP512r1, 2—brainpoolP384r1, 3—brainpoolP320r1.

Hardware authentication based on this key space looks as follows:

First, the cryptochip manufacturer certificate PrivCA (PubE) is requested and validated to ensure that the chip has been produced by a certified manufacturer: PubE=PubCA (PrivCA(PubE)).

Then, the PrivE(PubS) certificate is requested and validated to ensure that the cryptochip itself is certified: PubS=PubE(PrivE(PubS)).

Finally, the cryptochip is dynamically authenticated by verifying its public key against the private key using the Zero-knowledge proof principle. A random key K is generated for the given cryptographic encryption algorithm and sent to the cryptochip in encrypted format (PubS(K)). Then, it is restored: K=PrivS(PubS(K)), and all further communications with the cryptochip go though an encrypted channel with the K key.

Figure 5:
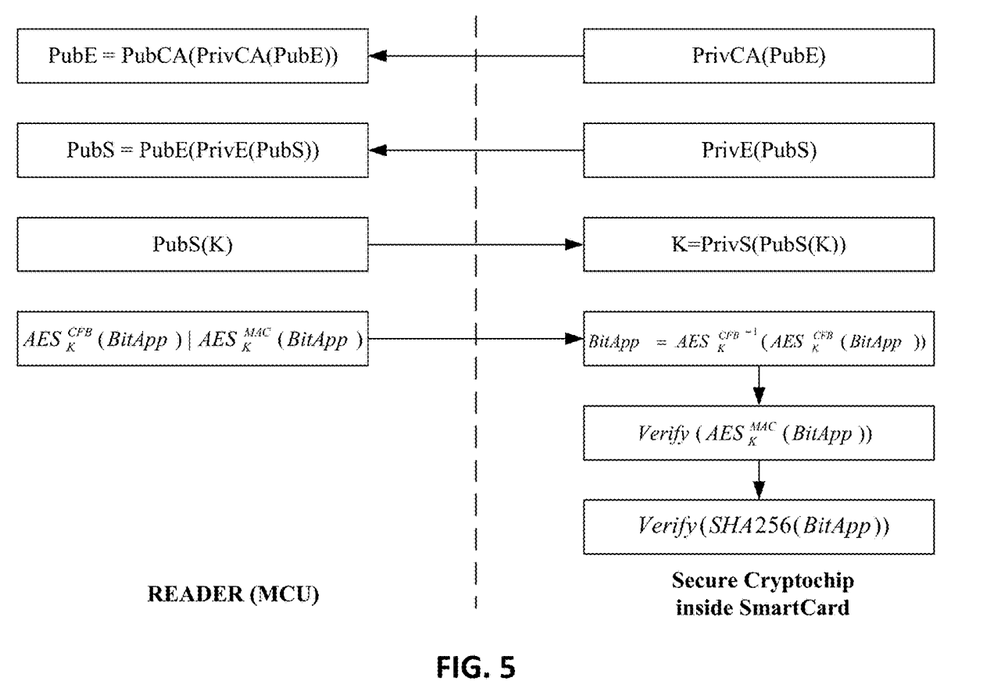
FIG. 5 shows the stages of the authentication procedure.

The procedure of authentication is shown in FIG. 5.

The system carries out cryptographic algorithms utilized in various cryptocurrencies, such as ECDSA digital e-signature check and generation (a set of points on an elliptic curve in accordance with secp256k1), hash functions SHA256, SHA512, SHA-3 (Keccak), scrypt(1024,1,1), X11, CryptoNight, Curl, X13, RIPEMD160, BLAKE2.

The cryptowallet user verification is carried out before authentication by inputting a PIN code (via the display only).

Cryptowallet Initialization and Recovery

[#MNEMONICSEED0] This functional block carries out cryptowallet seed generation and cryptowallet recovery procedures. After the user has been successfully authenticated, they can initiate generation or recovery of the 256-bit seed of the cryptocurrency key space (via the display only), and then they need to provide the PIN code for access.

Figure 6:
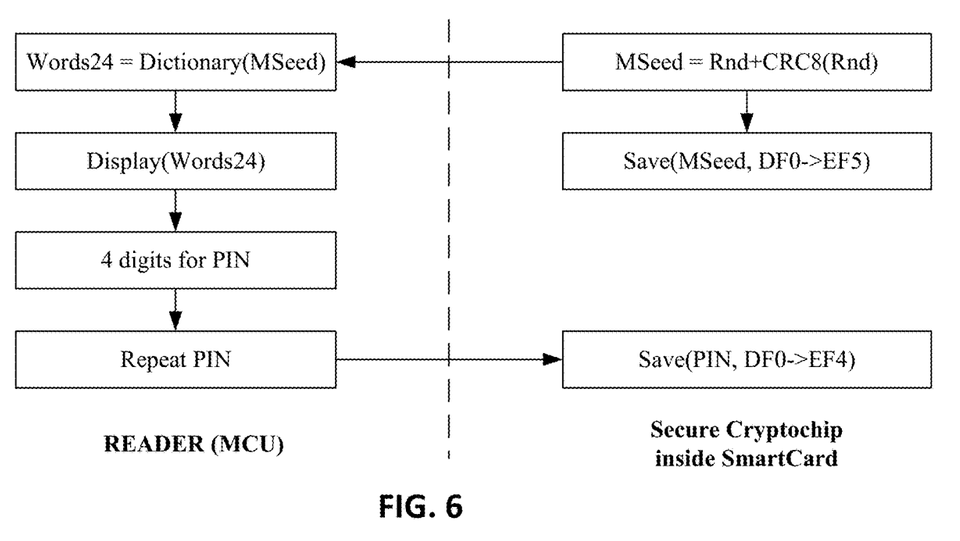
FIG. 6 shows seed and PIN code generation.
Figure 7:
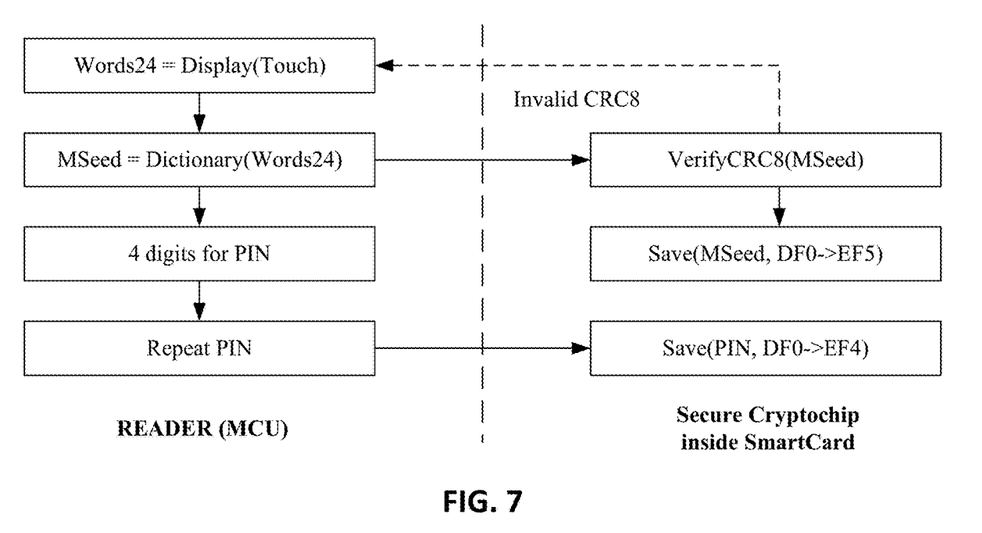
FIG. 7 shows restoration of a seed and PIN code generation.

[#MNEMONICSEED1] Seed generation begins with generating a random 256-bit number in the secure cryptoprocessor, where an 8-bit checksum is calculated (since the original number is random, an error check can be run using a cyclic code with an 8-power generator polynomial). The resulting bit array MSeed is stored in the authentication applet and then sent to the microcontroller, which divides in into twenty-four 11-bit numbers. For each number, an English word is taken from the mnemonic seed dictionary (~12.8 KB), and the words are displayed to the user. The user has to memorize the words (the actual method and security are decided by the user themselves). As an option, a secure cryptoprocessor can store the mnemonic seed (which may be placed, e.g., in a safe or another secure location). Then, the user sets a 4-digit decimal PIN code, which is also stored in the authentication applet (see FIG. 6).

Seed recovery begins with inputting 24 English words that have been memorized in advance, after which the microcontroller, using the dictionary, restores an array of 11-bit numbers, which then are concatenated into a 264-bit number, which is then sent to the cryptochip. There, the cyclic decoder checks the number for errors. If there are none, the number is stored in the authentication applet, otherwise a repeat input of the mnemonic seed is required. The PIN code is set in the same way as above.

Secure Key Space Management, Last State Storage, and Transaction Confirmation

[#APPLET0] Each cryptocurrency implemented in the cryptochip is made as a separate applet, i.e. each cryptocurrency has an individual DF folder assigned to it. The applet of a specific cryptocurrency stores three values in the file system (see FIG. 3): the name of the cryptocurrency (Name), the number of wallets/addresses (NumWallets), and the last state of balances of all wallets with this cryptocurrency (LastState).

Figure 8:
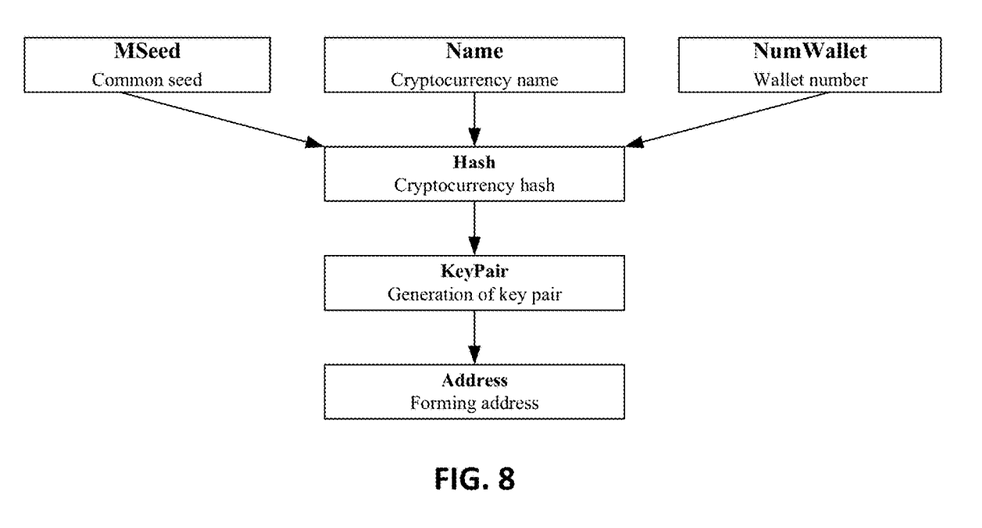
FIG. 8 shows dynamic generation of a key pair and address.

If necessary, each wallet's key pairs and address are generated dynamically (on the fly) from a seed (MSeed) using a hash function (or a hash stack) utilized in the given cryptocurrency (see FIG. 8).

[#TRANSACTION0] In other words, if there is a need to process a transaction (to generate a digital signature or to update the cryptocurrency balance—either for all accounts or for a specific address), after verification and authenticity check (and to confirm the transaction on screen, if necessary), a command is sent to the specific cryptocurrency applet, which then calculates the key pair and address. Then, depending on the command, either the digital signature for the transaction is generated or the address(es) are provided to the host application via the microcontroller. Finally, the host application returns the operation result to the microcontroller, which, in turn, sends it to the secure cryptoprocessor.

Host Application

The host application creates or recovers cryptowallets, interacts with cryptocurrency networks and exchanges venues (e.g., for payments or currency exchange), to provide information on wallet status, and to manage wallet access.

As an option, the host application uses the ReactJS framework and a style sheet (CSS). The entire interface and module interactions are scripted in the TypeScript language.

Note that normally host application does not contain or store wallet data objects, it only provides secure access to the data stored in a secure cryptoprocessor.

Optionally the host application can interact directly with secure cryptoprocessor for signing transactions by NFC connection Secure Cryptoprocessor By using a secure cryptoprocessor inside the SmartCard, it is possible to reliably store individual data, such as Private Keys used to work with distributed database networks, without the need to employ additional physical security measures, where the level of information security is at least EAL6.

Figure 9:
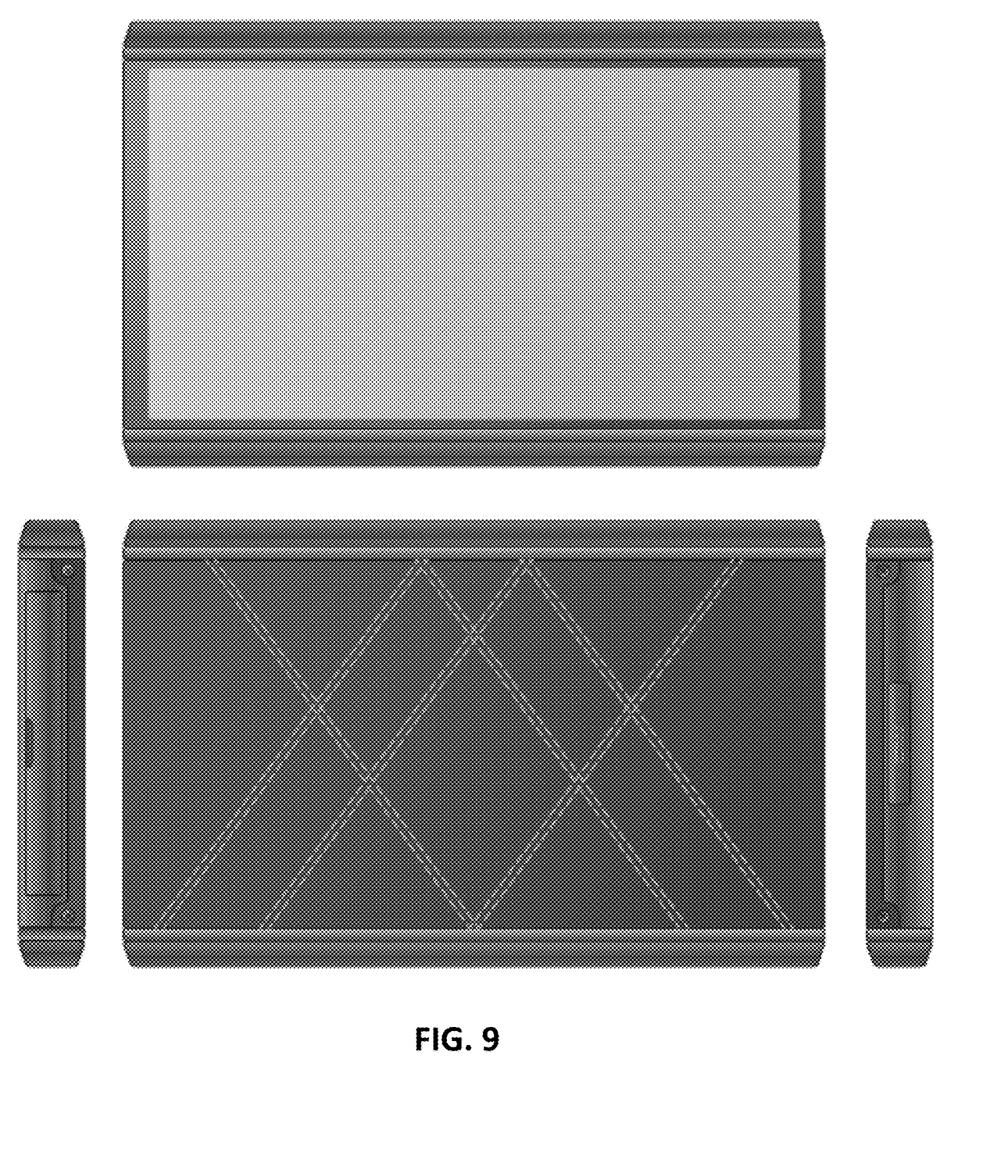
FIG. 9 shows an example of a hardware embodiment of the cryptowallet.

FIG. 9 shows an example of a hardware embodiment of the cryptowallet.

Figure 10:
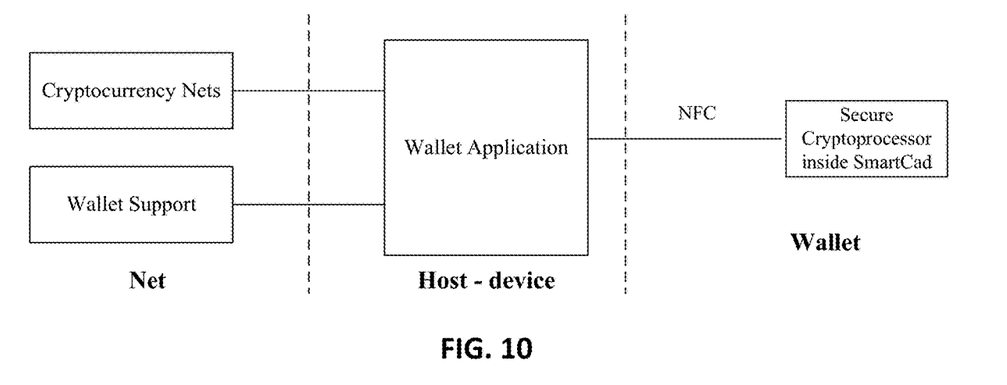
FIG. 10 shows an example of a structural schematic for a system based on connection a secure cryptoprocessor to host device by NFC.

FIG. 10 shows an example of a structural schematic for a system based on connection a secure cryptoprocessor to host device by NFC.

The main advantage of using such processor is that is has a protected memory area, which also provides physical protection. The data located in the protected area cannot be moved to an environment that cannot be continuously and reliably protected.

Having thus described a preferred embodiment, it should be apparent to those skilled in the art that certain advantages of the described method and apparatus have been achieved.

It should also be appreciated that various modifications, adaptations, and alternative embodiments thereof may be made within the scope and spirit of the present invention. The invention is further defined by the following claims.

What is claimed is:

1. A cryptowallet, comprising:
a microcontroller configured to communicate with a cryptowallet application running on a host;
a touch display connected to the microcontroller and used to input a PIN code and a mnemonic seed for the cryptowallet for each cryptocurrency, and to output a destination address for a transaction and the mnemonic seed;
a secure cryptoprocessor having storage and cryptographic logic and embedded on a SIM card;
wherein the storage stores a file system representing multiple cryptocurrencies,
wherein the file system is a tree that stores a private key for each cryptocurrency,
wherein the cryptowallet application is configured to communicate with a cryptocurrency network communication component, for carrying out transactions using the cryptocurrencies, that are authorized by using the private key upon providing the PIN code and the destination address of the transaction to the secure cryptoprocessor,
wherein the cryptographic logic implements cryptographic functions required by the cryptocurrencies, and
wherein the cryptowallet is configured to connect to the host using a USB connection, and
wherein connection between the microcontroller and the secure cryptoprocessor can be performed via the ISO7816 or NFC interfaces, and
wherein a three-level PKI is used for authentication of the cryptowallet, wherein each level has its own public-private key pairs, and wherein the three-level PKI includes public/private key pair for authenticating the SIM card, public/private key pair for authenticating that the SIM card was produced by a trusted manufacturer of the SIM card, and public/private key pair for a certification authority to certify the trusted manufacturer.

2. The cryptowallet of claim 1, wherein the secure cryptoprocessor is conceptualized as a set of applets managed by the JavaCard Operating System.

3. The cryptowallet of claim 2, wherein each of the applets is assigned a specific branch of the tree.

4. The cryptowallet of claim 2, wherein the cryptoprocessor implements applet configuration and update.

5. The cryptowallet of claim 1, wherein the cryptoprocessor implements a secure control for cryptographic key space for all the private keys stored on the cryptoprocessor.

6. The cryptowallet of claim 1, wherein the cryptoprocessor stores a most recent state of the cryptowallet.

7. The cryptowallet of claim 1, wherein the file system is used to separate private keys of the multiple cryptocurrencies from each other.

8. The cryptowallet of claim 1, wherein the secure cryptoprocessor generates a mnemonic seed from the private key for each cryptocurrency.

9. The cryptowallet of claim 1, wherein the secure cryptoprocessor implements an algorithm to interface to a distributed database network of that cryptocurrency utilizing the private key for the cryptocurrency.

10. The cryptowallet of claim 9, wherein the distributed database network is based on blockchain.

11. The cryptowallet of claim 1, wherein the cryptoprocessor implements a dynamic authentication procedure by verifying that a public key provided by a user corresponds to the private key for that cryptocurrency.

12. The cryptowallet of claim 1, wherein the secure cryptoprocessor is configured to receive the PIN code from the touch display.

13. The cryptowallet of claim 1, wherein the secure cryptoprocessor is configured to dynamically generate a private-public key pair and an address based on a mnemonic seed by using a hash function that corresponds to the particular cryptocurrency.

14. The cryptowallet of claim 2, wherein the secure cryptoprocessor interacts directly with host device application for signing transactions by NFC interface connection.

* * * * *